United States Patent [19]

Seibel et al.

[11] 4,449,036
[45] May 15, 1984

[54] ELECTRIC CIGAR LIGHTER WITH A SNAP DISK FORMING A BIMETALLIC SWITCH

[75] Inventors: Georg Seibel, Dreieich; Günther Mues, Dietzenbach-Steinberg; Theodor Horn, Kriftel, all of Fed. Rep. of Germany

[73] Assignee: Schoeller & Co., Frankfurt, Fed. Rep. of Germany

[21] Appl. No.: 469,257

[22] Filed: Feb. 24, 1983

[30] Foreign Application Priority Data

Feb. 26, 1982 [DE] Fed. Rep. of Germany ....... 3206904

[51] Int. Cl.³ ................................. F23G 7/02
[52] U.S. Cl. .................................. 219/265; 219/264; 219/267; 337/89; 337/380
[58] Field of Search ............... 219/260, 262, 263, 264, 219/265, 266, 267, 268, 512; 337/89, 380, 386

[56] References Cited

U.S. PATENT DOCUMENTS

| | | | |
|---|---|---|---|
| 2,207,601 | 7/1940 | Shakespeare et al. | 219/265 |
| 2,248,017 | 7/1941 | Cohen | 219/265 |
| 4,190,763 | 2/1980 | Seibel et al. | 219/265 |
| 4,207,455 | 6/1980 | Horwitt et al. | 219/265 |
| 4,230,931 | 10/1980 | Horwitt et al. | 219/265 |

FOREIGN PATENT DOCUMENTS

2652857 11/1976 Fed. Rep. of Germany ...... 219/264

*Primary Examiner*—Volodymyr Y. Mayewsky
*Attorney, Agent, or Firm*—Toren, McGeady and Stanger

[57] ABSTRACT

An electric cigar lighter, such as used in a motor vehicle, has a bimetallic switch in the form of a snap disk positioned within a socket. When using commercial appliance plugs with such a snap disk, the diameter of the socket does not need to be enlarged compared to conventional sockets. Contact bounce and contact interruptions are prevented. These advantages are achieved by placing the contact disk and a contact part on an adjustment ring inserted with a sliding fit into a tubular member located within the socket. A control knob for the lighter fits into a plug sleeve within the socket. A spring spider on the control knob locks onto an annular bulge on the plug sleeve provides a pressure point for quickly switching the heating element to the on-position.

9 Claims, 11 Drawing Figures

ELECTRIC CIGAR LIGHTER WITH A SNAP DISK FORMING A BIMETALLIC SWITCH

SUMMARY OF THE INVENTION

The present invention is directed to an electric cigar lighter, such as used in motor vehicles, and it includes a socket containing a snap disk forming a bimetallic switch, and a plug with a heating element which can be inserted into the socket. The handle or control knob of the plug is axially slidable within a plug sleeve mounted in the socket. The heating element is located in a cup and is held manually in the on-position against the effect of a restoring spring until the snap disk abruptly reverses position. In the on-position the heating element is connected to the heating circuit of the lighter by means of a contact part with contact tongues that interact with the snap disk.

It is known from German patent No. 26 52 867 to form contact tongues on a contact plate arranged at the end of an insulating member which is inserted into the socket and permits the radiation of heat from the heating element to the snap disk. The contact plate has lips which fit into slots in the insulating member and it is provided with stops for the snap disk. This arrangement has the disadvantage that, due to the insulating member, the diameter of the socket must be increased so that commercial appliance plugs can be used. As a result, the installation openings in dashboards must be enlarged so that use in the automobile industry is made extremely difficult and under certain circumstances is even prevented. Another disadvantage is the possibility of influencing the switching on process and causing contact bounce and contact interruptions with burns occurring at the spring tongue due to the high heating current in the magnitude of 20-30 A which could lead to failure of the lighter. Moreover, the snap disk is inadequately secured at the spring tongue plate so that axial movement and undesired contact interruptions at the outer rim of the snap disk are possible which could lead to burnout and consequent failure of the snap disk.

Therefore, it is the primary object of the present invention to avoid the above mentioned disadvantages and, in addition, to afford the mass production of an inexpensive cigar lighter. In accordance with the present invention the contact part is installed at an adjustment ring which is disposed with a sliding fit in a tubular piece, attached within the socket, and, further, the contact part has retaining means at its edge for securing the rim of the snap disk.

By utilizing an adjustment ring, inserted into a tubular piece, for retaining the contact part of the contact tongues for the heating element, and by using the connection of the contact part with the snap disk by the retaining means, located at the edge of the contact part, a compact and space-saving construction is achieved so that an increase in the socket diameter is unnecessary when using commercial appliance plugs. When the snap disk is secured to the contact part, in accordance with the present invention, axial displacement of the contact part is prevented as are undesirable contact interruptions which could result in burnout of the snap disk.

In a preferred embodiment of the invention the contact part is formed of an elastic material and is secured to the adjustment ring by elastic tongues. The retaining parts which hold the rim of the snap disk may be in the form of tongues or a beaded edge which affords a uniform contact pressure on the rim of the snap disk. The tubular piece which holds the adjustment ring may have an inwardly bent rim at one end attached to the bottom of the socket by insulating disks. The contact tongues for the heating element and the retaining tongues for the adjustment ring can be formed on a contact plate of the contact part which permits the radiation of heat from the heating element to pass to the snap disk, and the adjustment ring which holds the contact plate may also have a passage for the radiation of heat and recesses for the tongues at its outer edge.

To switch on the heating circuit, the control knob attached to the heating element is pushed into the socket, with the heating element engaging the contact tongues on the elastic contact part, in a manner as rapidly as possible so that contact bounce and contact interruptions are prevented. The control knob is provided with a stop element which is slidable in the plug sleeve within the socket. The stop element may be in the form of a spring spider serving, at the same time, as contact elements and for the fast displacement of the heating element to the on-position. In the plug sleeve, an additional sleeve with an annular bulge is provided for locking the spring arms of the stop element. Further, a plastic bushing is arranged for insulation purposes and for guiding the connecting axle extending between the control knob and the heating element. A thermal insulation plastic ring may be placed on the plug sleeve.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
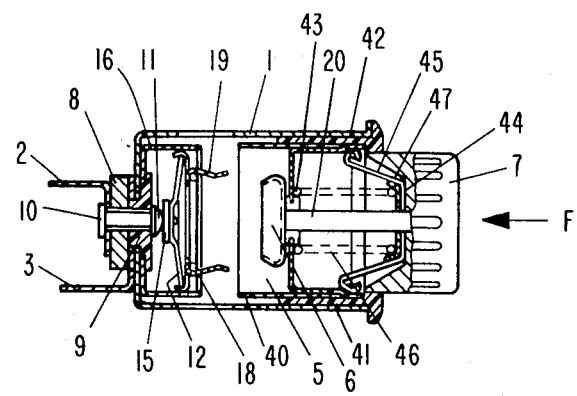
FIG. 1 is an axial sectional view through a cigar lighter embodying the present invention with the lighter shown in the inoperative or off-position.
Figure 2:
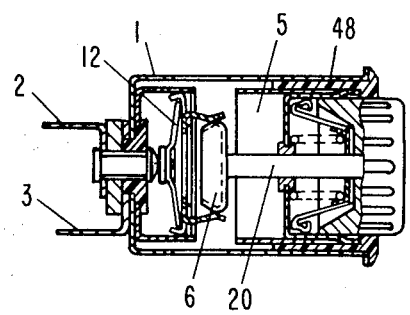
FIG. 2 is an axial sectional view similar to FIG. 1, however, with the lighter in the on-position.
Figure 3:
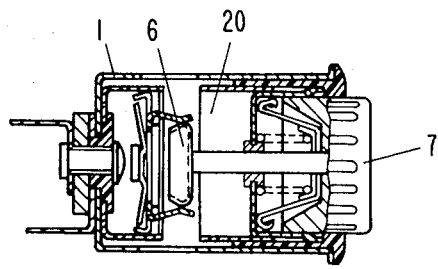
FIG. 3 is an axial sectional view similar to FIG. 2 but with the snap disk having abruptly reversed position so that the lighter is in the off-position.
Figure 4:
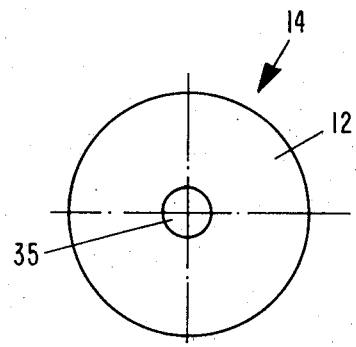
FIG. 4 is a plan view of the snap disk.
Figure 5:
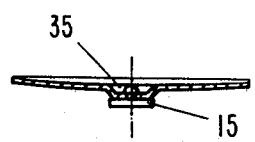
FIG. 5 is a sectional view through the snap disk shown in FIG. 4.
Figure 6:
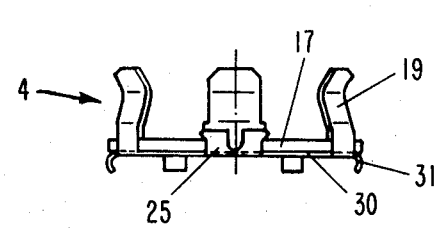
FIG. 6 is a side elevational view of a contact part.
Figure 7:
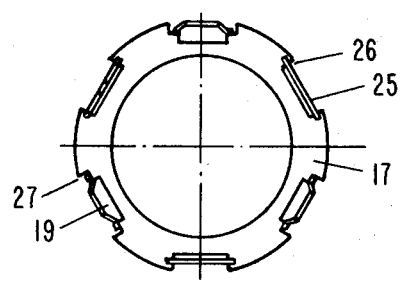
FIG. 7 is a plan view of the contact part shown in FIG. 6.
Figure 8:
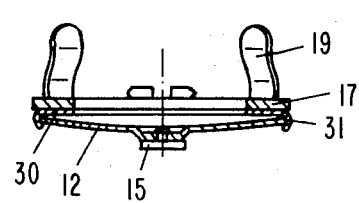
FIG. 8 is a sectional view through the contact part with the snap disk attached to it.

In FIGS. 1 to 8, a cigar lighter is illustrated including an axially elongated socket 1 having a first or left end and a second or right end as viewed in FIGS. 1-3. Connecting contact lugs 2, 3 project outwardly from the first end of the socket 1 and a contact part 4 and a plug 5 including the heating element 6 and a control knob 7 are located within the socket 1. The contact part 4 is located adjacent the first end of the socket while the plug 5 is inserted through the second end into the socket. At the base or first end of the socket 1, two insulating disks 8, 9 are held together by a rivet 10. Rivet 10 extends through openings in the insulating disks 8, 9 and through an opening in the first end of the socket 1 and secures the contact lug 2 against the insulating disk 8. Rivet head 11 within the bottom of the socket forms a fixed contact while a movable contact 15 is attached to a snap disk 12. Ground contact 3 is secured at the first end of the socket 1 by the insulating disk 8. Insulating disk 9 projects through the opening in the first end of the socket 1 and connects a cup-shaped tubular piece 16 to the socket 1. The tubular portion of the tubular piece 16 extends in the axial direction of the socket from the first end toward the second end. An adjustment ring 17, note FIGS. 6–8, is dimensioned so that it is held in a sliding fit within the tubular piece 16. The adjustment ring 16 supports a contact part 4 which includes the axially extending contact tongues 19 for the heating element 6 which is secured at the end of the connection axle 20 of the control knob 7, that is, it is located at the end of the axle extending into the socket. Contact part 4 is formed of an elastic material and has spring tongues 25, note FIGS. 6 and 7 which extend axially within the socket and engage within corresponding recesses 26 in the radially outer rim of the adjustment disk 17. The spring tongues 25 are spaced approximately equiangularly apart and equidistantly between the contact tongues 19. The tongues 19 are formed on a contact plate 30 and extend from the contact plate in the direction toward the second end of the socket. In addition, hook-shaped tongues 31 are provided on the outer edge of the contact plate 30 and extend in the opposite direction toward the first end of the socket. Hook-shaped tongues 31 secure the radially outer rim of the snap disk without any play. These tongues 31 provide a uniform contact pressure at the rim of the snap disk 12. Accordingly, snap disk 12, adjustment ring 17 and contact part 4 form a unit, note FIG. 8, which is inserted into the tubular piece 16, note FIGS. 1–3. The mechanical bias of the snap disk 12 can be adjusted economically and effectively by means of suitable known devices. As viewed in FIG. 5, it can be seen that one surface of the disk 12 is convex and the movable contact 15 is secured to this surface. As can be seen in FIGS. 1 and 2 the surface of the snap disk 12 carrying the movable contact 15 has a convex configuration, however, in the off-position of FIG. 3 the snap disk has reversed its position so that the surface supporting the movable contact 15 has a concave configuration.

Plug 5 inserted into the socket 1 from the second end has two sleeves 40, 41 with the sleeve 41 being cup-shaped and located within the sleeve 40. At its end close to the second end of the socket, the sleeve 41 has an annular bulge. A heat and current insulation plastic ring 48 encircles the sleeve 40 and extends from the second end of the socket 1 for a portion of the axial length of the sleeve 40. Centered within the sleeve 41 is a connecting axle 20 guided in a plastic bushing 43 positioned within an opening in the cup-shaped surface of the sleeve 41. The bushing 43 serves to insulate the axle 20 from the sleeve 41. A spring spider 44 is located within the sleeve 41 and it is positioned on the axle 20. Spring spider 44 has spring arms 45 which lock into the annular bulge 42 on the sleeve 41. A helical spring 46 extends between the spring spider 44 and the bottom of the sleeve 41, that is the cup-shaped surface of the sleeve. The helical spring 46 extends around the axle 20 and bears at one end against an insulating disk 47 in contact with the spring spider. The spring spider 44 is biased by the spring 46 against the control knob 7 located on the end of the connecting axle 20 extending toward the second end of the socket 1.

When the control knob 7 is pressed into the socket 1, initially, the biasing force of the spring spider must be overcome for axially displacing the heating element 6 between the contact tongues 19 so that the movement can be effected with considerable speed with the heating element assuming the position illustrated in FIG. 2.

The switching process cannot be influenced disadvantageously when a user presses the control knob slowly inwardly. With the heating element 6 connected to the heating circuit, after approximately two seconds the element is heated and heat is radiated passing through the openings in the adjustment disk 17 and the contact plate 30 causing an abrupt reversal in the convex configuration of the snap disk 12 so that its surface supporting the movable contact 15 adopts a concave configuration assuming the position illustrated in FIG. 3 and interrupting the contact between the heating element and the heating circuit. The heating element 6 now in the heated state, can be pulled out of the socket 1 for lighting a cigar or cigarette.

Figure 9:
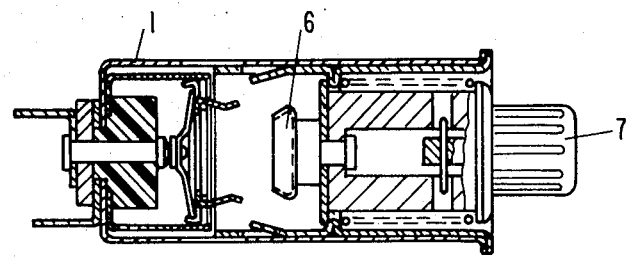
FIG. 9 is an axially extending sectional view of another embodiment of the present invention illustrating the cigar lighter in the off-position.
Figure 10:
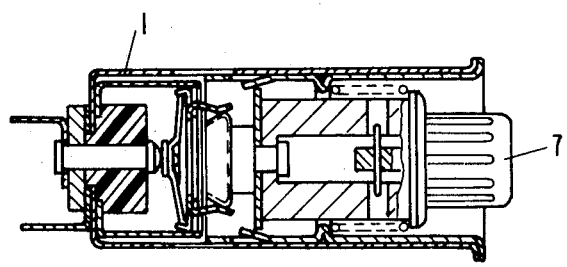
FIG. 10 is an axial sectional view, similar to FIG. 9, however, with the lighter in the on-position.
Figure 11:
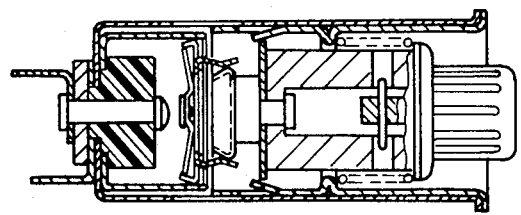
FIG. 11 is an axial sectional view similar to that shown in FIG. 10, after an abrupt reversal of the snap disk has occurred placing the lighter in the off-position.

As shown in FIGS. 9–11, the plug illustrated in FIGS. 1 to 3 of German patent No. 26 52 857 can be inserted into the socket 1 embodying the present invention.

While specific embodiments of the invention have been shown and described in detail to illustrate the application of the inventive principles, it will be understood that the invention may be embodied otherwise without departing from such principles.

We claim:

1. An electric cigar lighter, such as used in a motor vehicle, comprising a socket forming a tubular bore and having a first end and a second end, contact means in the first end of said pocket and forming a part of the heating circuit of the lighter, a bimetallic switch including a snap disk located within the tubular bore in said socket, a plug located within the tubular bore in said socket and including a cup containing a heating element, said plug including an axially extending plug sleeve, a control knob mounted in and axially displaceable within said plug sleeve, said control knob is connected to said heating element, a restoring spring positioned within said plug sleeve and in operative engagement with said control knob, said cup and heating element are movable between an off-position and an on-position by axially displacing said control knob into said socket, means for holding said snap disk within said socket, said cup containing said heating element is in engagement with said means in the on-position, in the on-position said snap-disk engages said contact means and connects said heating element to the heating circuit, wherein the improvement comprises that said contact means comprises a tubular member secured to the first end of said socket, said means for holding said snap disk comprises an adjustment spring disposed in a sliding fit within said tubular member, a contact part supported on said adjustment ring, and said contact part has an outer circumferentially extending edge extending around the inner surface of said tubular member and retaining parts secured to the outer edge for holding the outer rim of said snap disk.

2. An electric cigar lighter, as set forth in claim 1, wherein said contact part is formed of an elastic material and has elastic first tongues extending from the outer circumferentially extending edge thereof for securing said contact part to said adjustment ring.

3. An electric cigar lighter, as set forth in claim 2, wherein said retaining parts comprise second tongues secured to and extending from the outer circumferential edge of said contact part and said second tongues exercise a uniform contact pressure on the outer rim of said snap disk.

4. An electric cigar lighter, as set forth in claim 3, wherein said tubular member holding said adjustment ring has an inwardly bent rim at the first end of said socket, and insulating disks located at the first end of said socket for securing said tubular member to said socket.

5. An electric cigar lighter, as set forth in claim 3, wherein said contact part includes contact tongues for said cup and said heating element, said contact part includes a contact plate with said contact tongues and said first tongues formed on said contact plate, and said contact plate being annularly shaped and having an opening therethrough for the passage of heat radiated from said heating element to said snap disk, and said adjustment ring is annularly shaped for permitting the passage of heat radiating from said heating element, and the radially outer rim of said adjustment spring has recesses therein for said contact tongues and said first tongues.

6. An electric cigar lighter, as set forth in claim 1, wherein a locking element is engageable with said control knob and is axially slidable with said control knob.

7. An electric cigar lighter, as set forth in claim 6, wherein said locking element comprises a spring spider in contact with said control knob and a spring biasing said spring spider and control knob in the direction out of the second end of said socket, and for fast displacement of said heating element into the on-position, said spring spider forms a pressure point.

8. An electric cigar lighter, as set forth in claim 7, wherein said plug sleeve includes a second sleeve located within said plug sleeve and having an annular bulge, said spring spider having spring arms in locking engagement with the annular bulge in said second sleeve, said second sleeve having a cup-shaped end with an opening therethrough, a plastic bushing fitted into the opening in said cup-shaped end, said control knob including a connecting axle extending centrally through said second sleeve and through said plastic bushing, said heating element secured to the end of said connecting axle which extends through the opening in the cup-shaped end of said second sleeve and said plastic bushing affords insulation and guidance for the connecting axle as said control knob and heating element are displaced axially within said socket.

9. An electric cigar lighter, as set forth in claim 8, wherein a heat and current insulating plastic ring is positioned within said socket adjacent the second end thereof between the inside surface of said socket and said plug sleeve.

* * * * *